3,167,591
ORGANIC PEROXIDE PREPARATION
Newton G. Leveskis, Richmond, Calif., assignor to
U.S. Peroxygen Corporation, Richmond, Calif.
No Drawing. Filed May 1, 1961, Ser. No. 106,454
5 Claims. (Cl. 260—610)

This invention relates to the preparation of tertiary alkyl peroxides. More particularly, it relates to an improvement in the method for their production that results in exceptionally high yields free from unwanted by-products and without the danger of explosion normally associated with organic peroxide production when heating hydrogen peroxide.

The present process follows closely the broad procedures of the prior art in that the peroxides under consideration are made by reacting the tertiary alkyl salt of an inorganic acid with hydrogen peroxide to obtain the desired organic peroxide. However, it is also taught by the prior art that the foregoing procedure is carried out at temperatures of about 0° C. and less and that the hydrogen peroxide is added gently and slowly while the reaction mixture itself is merely allowed to stand.

The present improvement represents a radical departure from these latter conditions and requires heating of the reaction mixture. In addition, in accordance with the present improvement, it is preferred to stir the reaction mixture, the stirring most preferably being relatively vigorous and continuous throughout the course of the reaction.

By making the foregoing changes in the prior art method, it has unexpectedly and surprisingly been found that the yield of the desired organic peroxide product is well in excess of 90% based on the starting organic reactants, that no explosions are encountered as a result of the heat supplied to the hydrogen peroxide reaction mixture, and that the by-products that would normally be expected to appear as a result of the heat are not found. The high yield obtained as a result of the present improvement is approximately double that obtained by the prior art conventional processes such as those taught in United States Patent 2,223,807 patented December 3, 1940 and Organic Peroxides by Tobolsky and Mesrobian, Interscience Publishers, Inc., 1954, pages 3-4.

There are, of course, other known methods of obtaining the same organic peroxides that are within the scope of the present invention in reasonably high yields. Unfortunately, they require relatively expensive reactants such as a hydroperoxide having an organic radical corresponding to the organic radicals that are desired in the peroxide. The presently improved method is distinguishable from these processes in that it requires relatively inexpensive readily available starting materials such as those disclosed in the above noted Patent No. 2,223,807.

The previously discussed restrictive conditions as to temperature and agitation taught by the prior art methods were ostensibly necessary and logically well founded. It is well known that hydrogen peroxide in concentrated form is highly unstable and subject to explosion, especially when heated. These properties of hydrogen peroxide are summarized in Hydrogen Peroxide, Schumb, Saaterfield, & Wentworth, Reinhold Publishing Corporation, 1955, pages 176–180. Thus, it was previously believed to be imperative that elevated temperatures not be employed.

In addition, it was believed that elevated temperatures and agitation would give rise to undesired by-products and result in an even lower yield of the peroxide than was obtained. It was previously believed that competing side reactions resulting in polymer formation involving the starting organic materials would take place. For example, in the preparation of tertiary butyl peroxide from tertiary butyl sulfate, the tertiary butyl sulfate is present in equilibrium with isobutylene. It is well known that isobutylene in the presence of sulfuric acid and heat will form di-isobutylene, tri-isobutylene, and higher polymers. This is taught, for example, in The Chemistry of Petroleum Hydrocarbons, volume III, Brooks, Kurtz, Boord & Schmerling, Reinhold Publishing Corporation, 1955, pages 227–229.

Contrary to the teaching of the prior art, it has been found that not only does the use of heat and agitation fail to give rise to undesirable side reactions and other problems, but results in the production of an especially high yield of the desired peroxide end product.

In carrying out the present improved process, the reaction is conducted preferably in liquid phase. While it is possible to use either super-atmospheric or sub-atmospheric pressures if desired, it is preferred and most convenient to use atmospheric pressure. As noted above, the improved result is obtained by heating the reaction mixture. Preferably, the reaction mixture is heated to between about 30° C. and 75° C., with best results generally obtained by heating to a temperature between about 35° C. and 60° C. It has been found that most excellent results are obtained with a temperature of about 45° C. Moderate variations from these temperatures may be beneficial for certain reactants and products.

In addition to heating the reaction mixture, the improved yields will more likely be obtained if the mixture is agitated or stirred; it is therefore preferred to do so. Most preferably, the reaction mixture is substantially continuously stirred from the time of initial contact between the starting materials until the reaction has gone to completion. In most cases, this time will be on the order of several hours and generally will not exceed about six hours.

The starting materials to be used in the present invention are generally those taught by the prior art and include the tertiary alkyl salts of inorganic acids. The salt selected is reacted with hydrogen peroxide. To obtain any desired tertiary alkyl peroxide, it is only necessary to select as a starting material the corresponding tertiary alkyl salt having a tertiary alkyl radical identical to the organic radical that is bonded to each of the open valences of the peroxy (—O—O—) radical in the desired peroxide end product. For example, if it is desired to make tertiary butyl peroxide, a suitable starting material is tertiary butyl sulfate. If the final product is to be tertiary amyl peroxide, a suitable starting material would be tertiary amyl sulfate.

While the present improved process is applicable to all tertiary alkyl acid salts, it is preferred that the salt contain a tertiary alkyl group of from 4 to 12 carbon atoms and that the salt be one of a strong acid, i.e. an organic or inorganic acid having a pKa of less than about 3. Examples of suitable starting materials include among others the following salts in all of their isomeric forms:

t-Butyl phosphate
t-Amyl nitrate
t-Hexyl benzene sulfonate
t-Octyl chloride
t-Dodecyl sulfate It will be appreciated by those skilled in the art that certain of the strong acids such as sulfuric are polybasic, and are capable of forming both monobasic and polybasic salts with the starting organic compounds. Accordingly, the present invention includes the use of mono-and/or polybasic salts wherever the selected acid permits the existence of both types.

The tertiary alkyl salt is prepared by any suitable process. Two convenient methods include reacting either a corresponding secondary mono-alkene or a corresponding tertiary alkyl alcohol with the selected inorganic acid in the cold, preferably at about 0° C. By corresponding alcohol is meant an alcohol having a tertiary alkyl radical bonded to the hydroxyl group that is identical to at least one of the alkyl radicals desired in the peroxide product that is bonded to the peroxy radical. By corresponding secondary alkene is meant an alkene which when reacted with an inorganic acid produces a tertiary alkyl salt. In other words, the double bond is associated with the secondary carbon atom so that addition of an acid molecule to the carbon-carbon double bond results in a saturated tertiary alkyl salt. Corresponding alkenes are those in which the tertiary alkyl salt produced is identical to the tertiary alkyl salt obtained from the aforementioned corresponding alcohol.

For purposes of the present invention, it is preferred that a molar excess over the theoretical requirements be used of the organic alcohol or alkene with respect to the inorganic acid. The hydrogen peroxide is suitably added directly to the reaction mixture of the inorganic acid and the alcohol or alkene.

The hydrogen peroxide is added to the alkyl salt in any amount which results in appreciable product formation. Preferably, however, the organic salt is added in a moderate excess with respect to the hydrogen peroxide. In the preferred embodiment the organic salt is prepared from a corresponding alcohol from an excess of the alcohol. The hydrogen peroxide is added directly to the solution. The excess alcohol present tends to prevent formation of undesired side reactions and accompanying yield reduction.

When the reaction has gone to completion, the peroxide layer may be separated and purified by any suitable sequence of steps. For example, the peroxide layer may be washed with water and/or neutralized with a base such as magnesium carbonate.

Details of the present invention are best demonstrated with reference to the following examples which are offered for illustrative purposes only.

*Example I*

Tertiary butyl sulfate was prepared from 242 parts of tertiary butyl alcohol and 189 parts of 70% sulfuric acid by intermixing them in a 12 gallon reactor equipped with stirrer and heat exchanger. The temperature throughout the mixing was maintained at about 0° C.

173 parts of 30% hydrogen peroxide was added to the reaction mixture when the reaction between the foregoing material had gone to completion. Upon the addition of hydrogen peroxide, the mixture was stirred and heated at 45° C. for 4½ hours. The mixture was then cooled to room temperature and allowed to settle. Two layers appeared. The top layer was washed three times with 160 parts of water. The material obtained was tertiary butyl peroxide having a purity of 98.6%. Its specific gravity was .791 20° C./40° C. and the refractive index was 20/D 1.3886. The yield of tertiary butyl peroxide based on the hydrogen peroxide employed was 96%. No di-isobutylene, tri-isobutylene, or higher isobutylene polymers were found in the reaction product.

*Example II*

A tertiary butyl peroxide was prepared from tertiary butyl alcohol in the same manner as in Example I except that the tertiary butyl alcohol was not used in excess as in Example I. In addition, a Dry Ice condenser was attached to the 12 gallon reactor for condensing any low boiling vapors. Analysis of the reaction product showed the presence of only a few parts of isobutylene present while the yield of tertiary butyl peroxide based on the tertiary butyl alcohol was 91%.

*Example III*

Tertiary butyl peroxide was prepared by the method of Example I. To demonstrate the safety of using heat in accordance with the present invention, the following tests were made. Three samples were taken from the reaction mixture. Sample 1 was removed from the reaction mixture after the addition of hydrogen peroxide. Sample 2 was removed one hour later and sample 3 was taken after the reaction had gone to completion. 10 ml. of each sample was placed in separate 15 x 150 mm. Pyrex test tubes and each test tube was placed in a 7 inch section of ¾ inch lead pipe having a ¼ inch wall thickness. A No. 6 blasting cap was lowered into each test tube so that the shell of the cap was half immersed in the sample. Just before immersion of the blasting cap, samples 2 and 3 were heated to 55° C. All three caps were set off. None of the samples fragmented the lead pipes.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for preparing a tertiary alkyl peroxide which comprises reacting an excess of a tertiary alkyl alcohol with an inorganic acid in liquid phase to produce a soluton containing a tertiary mono-alkyl salt, then reacting said tertiary mono-alkyl salt solution with hydrogen peroxide while maintaining the reaction mixture at about 35° C.–60° C. and substantially continuously stirring the mixture throughout the course of the reaction, and then recovering a tertiary alkyl peroxide.

2. A method in accordance with claim 1 wherein said inorganic acid is sulfuric acid and said tertiary monoalkyl salt is tertiary alkyl sulfate.

3. A method for preparing tertiary butyl peroxide which comprises reacting an excess of tertiary butyl alcohol with sulfuric acid in liquid phase in the cold to produce a solution containing tertiary butyl sulfate, then reacting said tertiary butyl sulfate solution with hydrogen peroxide while maintaining the reaction mixture at about 45° C. and substantially continuously stirring the mixture throughout the course of the reaction, and then recovering tertiary butyl peroxide.

4. In the method for the preparation of a tertiary alkyl peroxide by reacting a tertiary alkyl acid salt with hydrogen peroxide in liquid phase, the improvement which comprises materially increasing the yield of said peroxide by heating the reaction mixture to a temperature of about 45° C., and stirring the reaction mixture substantially continuously throughout the course of the reaction.

5. The improved method of claim 4 wherein said tertiary alkyl peroxide is tertiary butyl peroxide and said tertiary alkyl acid salt is a tertiary butyl acid salt.

References Cited in the file of this patent

UNITED STATES PATENTS 2,223,807   Milas _____ Dec. 3, 1940

OTHER REFERENCES

Milas et al.: Jour Amer. Chem. Soc., vol 68 (1946), pages 205–208 (4 pages).